Aug. 2, 1938.    M. KESSLER ET AL    2,125,614
BEVERAGE DISPENSING DEVICE
Filed Dec. 10, 1935    2 Sheets-Sheet 1
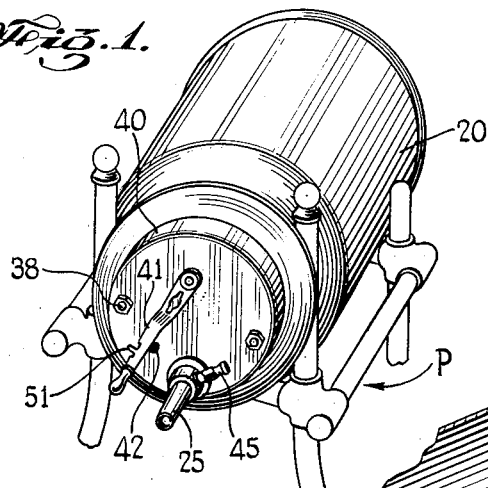
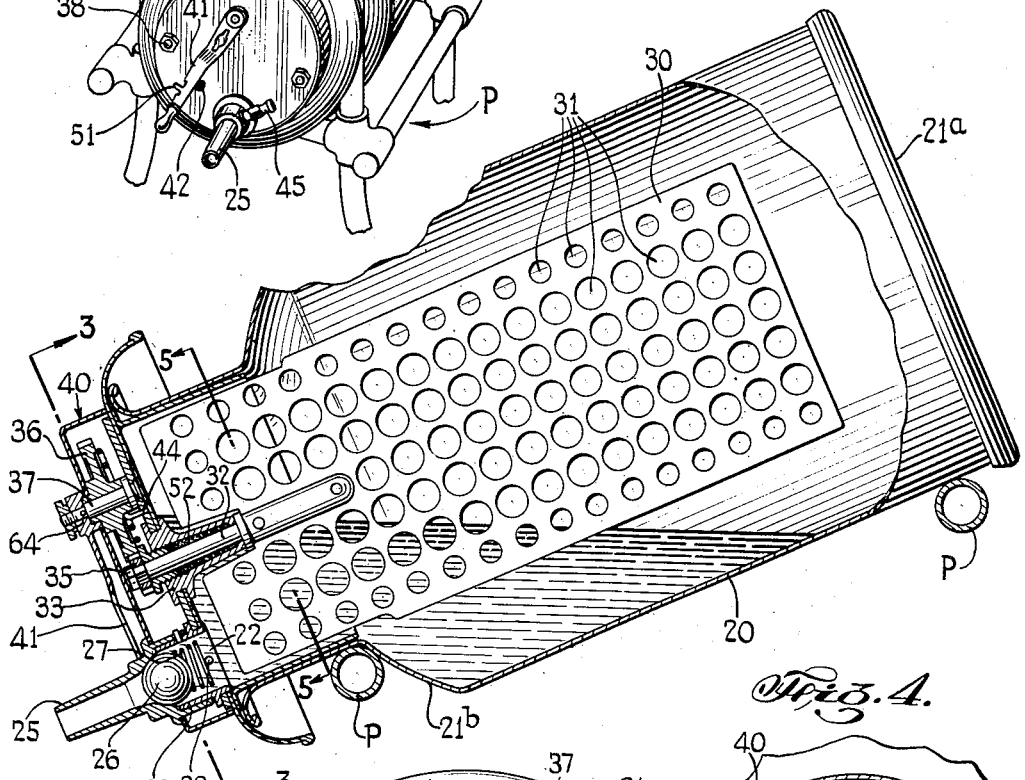
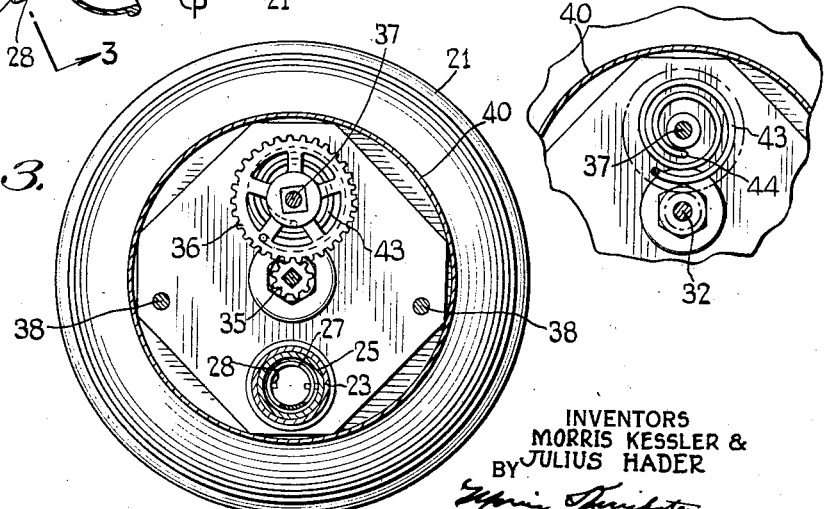
INVENTORS
MORRIS KESSLER &
BY JULIUS HADER
ATTORNEY Aug. 2, 1938.  M. KESSLER ET AL  2,125,614
BEVERAGE DISPENSING DEVICE
Filed Dec. 10, 1935  2 Sheets-Sheet 2
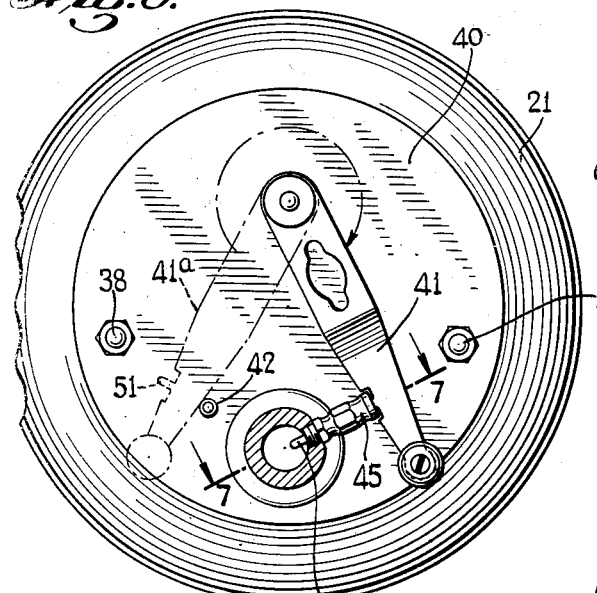
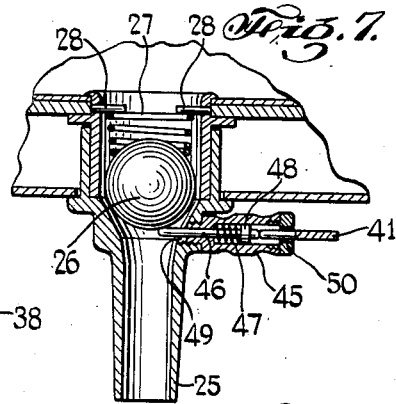
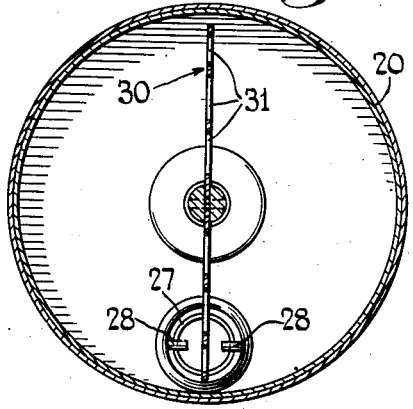
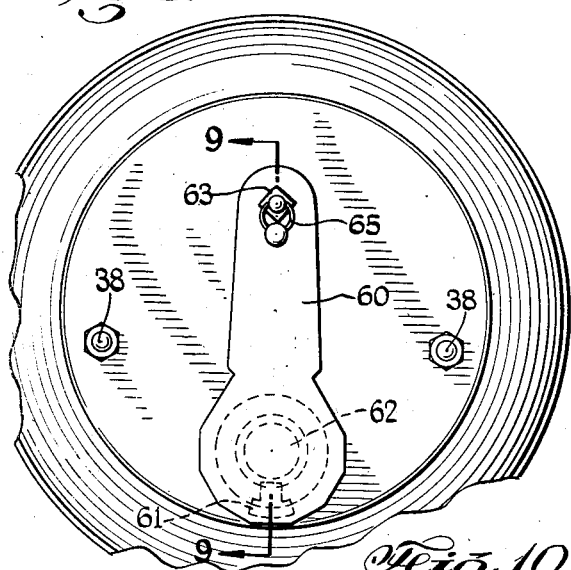
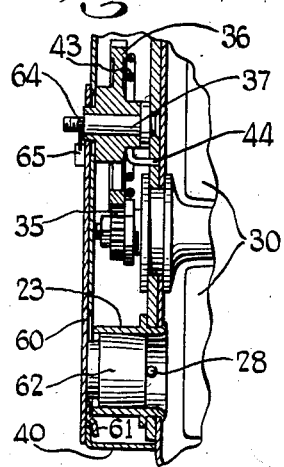
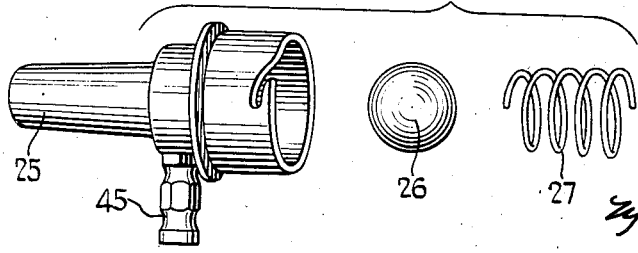
INVENTORS
MORRIS KESSLER &
JULIUS HADER
BY
ATTORNEY Patented Aug. 2, 1938

2,125,614

UNITED STATES PATENT OFFICE 2,125,614

BEVERAGE DISPENSING DEVICE

Morris Kessler and Julius Hader, Brooklyn, N. Y.

Application December 10, 1935, Serial No. 53,696

8 Claims. (Cl. 221—67)

Our invention relates to beverage dispensing devices, and more particularly to the type of devices used for dispensing milk.

Certain features of the construction shown and described and claimed in this application are shown and described but not claimed in copending application of Morris Kessler et al., Ser. No. 31,573, filed July 16, 1935 for Beverage dispensing devices.

Milk dispensing devices heretofore used in establishments where milk is sold or served, generally comprised a pump mechanism immersed in the milk within the container. One disadvantage of this type of construction has been the difficulty experienced when cleaning the numerous parts comprising the pump mechanism with the result that Health Departments in certain localities have ruled against the pump type of milk dispenser.

It is well known that when milk is permitted to rest in a container for any considerable period of time there is a tendency for the cream to separate from the milk and rise to the top, with the result that when milk is dispensed from such containers certain of the purchasers will receive milk substantially free of cream and the desirable butter fats contained therein. Therefore, additional Health Department requirements in certain localities provide that the milk must be thoroughly mixed before dispensing.

It is the principal object of our invention, therefore, to provide a dispensing device for milk and the like beverages which will thoroughly mix the milk just prior to the dispensing thereof and in which a minimum number of parts shall contact the milk, thereby minimizing the difficulties experienced with cleansing.

Another object of our invention is to provide a dispensing device of the character described in which the mechanism for dispensing shall be independent of any pumping or pressure means.

Still another object of our invention is to provide a dispensing device of the character described, in combination with a container having means whereby the said container may be filled at the milk distributing depot, and sealed against tampering with the contents therein until delivery to the point where it is to be dispensed.

A further object of our invention is to provide a device of the character described comprising few and simple parts, which shall be rugged in construction, easy to assemble, inexpensive to manufacture and at the same time operate with a high degree of efficiency for the purpose intended.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention, Fig. 1 is a view in perspective showing a device embodying the various features of our invention and illustrating a method of mounting therefor;

Fig. 2 is a longitudinal sectional view of the Fig. 1 form of device disclosing the operating mechanism;

Fig. 3 is a cross-sectional view taken substantially on the line 3—3 of Fig. 2;

Fig. 4 is a detail view partly sectional of a portion of the apparatus disclosed in Fig. 3;

Fig. 5 is a cross-sectional view taken substantially on the line 5—5 of Fig. 2;

Fig. 6 is a front end view of the Fig. 1 form of device, partly sectional, and illustrating the method of operation;

Fig. 7 is an enlarged detail view, in section, taken substantially on the line 7—7 of Fig. 6;

Fig. 8 is a view similar to Fig. 6 illustrating one of the features of our invention;

Fig. 9 is a cross-sectional view taken substantially on the line 9—9 of Fig. 8; and Fig. 10 is an enlarged detail view in perspective illustrating the method of assembly of one element of our invention.

Referring now in detail to the drawings, there is disclosed a preferred embodiment of our invention comprising a suitable container 20, which may take the usual form for milk containers, or which may be of any desired shape. A closure member 21 is provided to cover the open end of the container 20. While, in the drawings, we have shown the usual type of milk container cover, it is understood that any suitable closure member may be used, or if desired, the container 20 may be provided with an integral closure wall.

The member 21 is provided with a through opening 22 having fixedly mounted therein a hollow tube 23 extending outwardly from said member 21 and adapted to have connected thereto by such means as a bayonet connection, a dispensing nozzle 25. The through passageway of the nozzle 25, together with the opening in the tube 23 and the opening 22 are in alignment with each other and communicate with the interior of the container 20.

It is noted in Figs. 1 and 2 of the drawings that the container 20 may be tiltedly supported so that it rests at an angle to the horizontal. In other words, the bottom 21a of the container is elevated above the plane of the nozzle 25.

Any suitable supporting means may be employed, such as the pipe construction P shown in Fig. 1 of the drawings. The container 20 is tiltedly supported as shown and described, in order that the milk from the container 20 may readily flow out through the nozzle 25 to be dispensed, thus eliminating the necessity for providing a pumping mechanism for the purpose. To prevent the milk in the container 20 from continuously discharging through the nozzle 25, a ball valve 26 is provided which is adapted to be pressed against a valve seat in the nozzle passageway to prevent the flow of milk therethrough. The valve 26 is normally held in closed position, as shown in Fig. 2 of the drawings, by such means as a resilient member 27 one end of which abuts against a pair of projecting pins 28 fixedly mounted in the tube 23 while the other end thereof is designed to urge the valve 26 against the said valve seat. The manner in which the valve 26 is caused to open when it is desired to dispense milk from the container will become apparent as the description proceeds.

In order to thoroughly mix the milk in the container 20 we have provided a paddle or agitator 30 having a plurality of spaced perforations 31 therein. The agitator 30 may be fixedly mounted on a shaft 32 which is journaled in a bearing 33, said bearing being mounted on the member 21. It is seen that whenever the shaft 32 is rotated the agitator paddle 30 will simultaneously rotate about its axis which may be in alignment with the axis of the shaft 32, to mix the milk in the container 20. Suitable means are provided for rotating the shaft 32, comprising a pinion 35 mounted on the shaft 32 for rotation therewith. The pinion 35 is adapted to mesh with a gear 36 mounted on a shaft 37 for rotation therewith. One end of the shaft 37 is journaled in the member 21, the other end being journaled in one wall of a casing 40. The function of the casing 40 is to provide a protective enclosure for the gears 35 and 36 and the tube 23. The casing 40 may be attached to the member 21 by any suitable means, such as screws 38. A suitable opening is provided in the casing 40 to accommodate the nozzle 25 therethrough after it has been detachably attached to the tube 23.

It will be understood from the above description that when the shaft 37 is rotated the gear 36 mounted thereon will drive the pinion 35 to rotate the agitator paddle 30. In order to facilitate the rotation of the shaft 37 a handle 41 may be suitably attached to an extended portion of the shaft 37 disposed outside of the container 20 and the casing 40. The handle 41 normally rests against a stop 42, as shown in the dotted line position 41a in Fig. 1 of the drawings, and is held in said position by means of a suitably designed spring 43, having one end thereof fastened to the member 21 at 44 (see Fig. 9) while the other end thereof may be fastened to the gear 36. From the above described construction, it is seen that the handle 41 may be turned in a clockwise direction only against the action of the spring 43.

Attached to the nozzle 25 in any suitable manner, such as by being screw threaded thereto, is a member 45 adapted to house a plunger 46 therein, said plunger 46 being adapted to be slidably reciprocated in a longitudinal through passageway in the member 45, said passageway communicating with the interior passageway of the nozzle 25, at a point which may be adjacent the ball 26, through an aperture 49 in said nozzle 25. A spring 47 is provided which normally tends to withdraw the plunger 46 entirely out of the nozzle opening by having one end thereof abut against a shoulder 48 on the plunger 46 while the other end thereof is adapted to rest against the housing 45. The end of the member 45 opposed to the screw threaded end, is provided with an aperture 50 communicating with the plunger passageway, the shoulder 48 serving to prevent the plunger 46 from passing out through the aperture 50. By reason of our construction just described, it is seen that when the plunger 46 is caused to be projected inwardly of the nozzle 25, it will strike and dislodge the ball valve 26 from its closed position against the valve seat to the open position as shown in Fig. 7 of the drawings, to permit the milk from the container to be discharged through the nozzle 25.

It will be noted that the handle 41 is provided with a projecting pin 51 which is adapted to enter the aperture 50 in order to move the plunger inwardly against the action of the spring 47 and thereby open the valve 26 whenever the handle 41 is turned in a clockwise direction a predetermined amount.

The operation of our device for dispensing milk will now be described.

A suitable receptacle such as a glass or bottle (not shown) for receiving the milk from the container 20, is held in proper position with respect to the nozzle 25. The handle 41 is then turned from the dotted line position 41a in a clockwise direction, to the full line position shown in Fig. 6 of the drawings, against the action of the restoring spring 43, the projecting pin 51 being adapted to enter the aperture 50 of the housing 45 to cause the plunger 46 to travel inwardly to open the valve 26 in the manner hereinbefore described. The milk will then flow freely from the container 20 without the aid of any pumping device or pressure means because of the angular tilt of said container. The handle 41 is thus held with the projecting pin 51 pressing against the plunger 46 until the desired amount of milk has been dispensed. While the handle 41 travels in the path above described, the agitator paddle 30 is caused to be rotated to thoroughly mix the milk in the container 20 by means of the gear 36 and the pinion 35, as hereinbefore described. It is thus seen that before the valve 26 is opened to permit the discharge of the milk from the container 20 the said milk has been thoroughly mixed.

After a desired amount of milk has been dispensed, the handle 41 is released and the action of restoring spring 43 of suitable strength for the purpose will return the handle to its original position to rest against the stop 42. During the return movement of the handle 41 the agitator paddle 30 will again be rotated to once more mix the milk in the container, due to the action of the gears 36 and 35. To prevent the possibility of the milk from the container 20 leaking out through the bearing 33 by way of the shaft 32 due to the tilting of the container, we have provided a suitably designed packing 55 preferably of a material which will not be affected by the acid in the milk.

Thus it is seen that by our invention we have provided a dispenser in which the milk is thoroughly mixed immediately before dispensing and in which the driving mechanism for said mixing means is disposed outside of the container 20. There are therefore a minimum number of parts contacting the milk, such as for example, the paddle 30, the nozzle 25, the valve 26 and the spring 27. It will be noted that these parts have been designed as far as practical with rounded contours in order that they may be readily cleaned.

The speed with which the paddle 30 is caused to rotate while the handle 41 is turned may be regulated by changing the ratio between the gear 36 and the pinion 35 to obtain a greater or lesser degree of agitation of the milk, as desired.

It may be desirable at certain times to lock and seal the container 20 after it has been filled with milk at the milk depot in order to prevent tampering therewith until such time as it is delivered to an establishment to be dispensed. For this purpose we have provided a locking and sealing device comprising a locking member 60 having a lip 61 disposed at one end thereof. To properly position the said member 60, the nozzle 25 and the valve 26 at one end thereof are first removed from the tube 23. The container is then filled with milk through the tube 23, or in any other suitable manner, after which a plug 62 is inserted in said tube 23 to prevent the milk from flowing out of the container 20. The member 60 is then placed in position so as to overlie the plug 62, the lip 61 engaging the edge of the casing 40 adjacent the opening therein adapted to accommodate the nozzle 25. The other end of the member 60 is provided with an aperture 63 which is adapted to receive the shaft 37 therein after removing the handle 41 from said shaft 37. The extended portion of the shaft 37 projecting above the member 60 is provided with a hole 64 which is adapted to have a continuous seal 65 inserted therein. The above described construction is so designed that in order to remove the lock member 60 to extract the plug 62, it is necessary to first break the seal 65.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. In a device of the character described comprising a container having a removable cover and adapted to hold a beverage, a discharge aperture in said cover communicating with the interior of said container, means for normally restricting the discharge of said beverage from said container, and means for rendering said restricting means ineffective and to permit the discharge of said beverage from said container, said last named means including means mounted on said cover for agitating said beverage to thoroughly mix the same before it is permitted to be discharged from said container.

2. In a device of the character described comprising a container having a removable cover and adapted to hold a beverage, a discharge aperture in said cover communicating with the interior of said container, means for normally restricting the discharge of said beverage from said container, and means for rendering said restricting means ineffective and to permit the discharge of said beverage from said container, said last named means including means mounted on said cover for agitating said beverage in the container to thoroughly mix the same before and after it is permitted to be discharged from said container.

3. In a device of the character described comprising a tiltedly supported container adapted to hold a beverage, a cover therefor to prevent said beverage from flowing out of said container due to said tilting, a discharge aperture in said cover communicating with the interior of said container, means for normally restricting the discharge of said beverage through said aperture, and means for rendering said restricting means ineffective to permit the discharge of said beverage through said aperture, said last named means including a rotatably mounted agitator within said container adapted to thoroughly mix the beverage before it is permitted to be discharged from said container, means for driving said agitator, and means whereby said driving means is prevented from coming in contact with said beverage.

4. A device of the character described comprising a tiltedly supported container adapted to hold a beverage, a cover therefor to prevent said beverage from flowing out of said container due to said tilting, a discharge aperture in said cover communicating with the interior of said container, a rotatably mounted agitator disposed within said container, and means in said cover for driving said agitator, said last named means including means whereby said beverage is permitted to be discharged through said aperture only after a predetermined period of agitation thereof.

5. In combination with a milk dispensing device of the character described comprising a container and a cover therefor, said cover having a discharge outlet therethrough, means for supporting said container whereby said milk will normally tend to flow unaided through said outlet, means for restraining said flow through said outlet, a milk agitator disposed within said container, means for driving said agitator, and means whereby said flow restraining means is adapted to be rendered ineffective so as to permit the flow of milk through said outlet after a predetermined period of operation of said driving means.

6. A device of the character described for dispensing milk and the like, comprising a container having bottom and side walls, and a detachable closure member forming the top wall thereof, said top wall being provided with a discharge aperture therein to permit the milk to be dispensed therethrough, means tending to normally restrain the discharge of the milk from said container, a shaft rotatably mounted on said top wall, an agitator mounted on said shaft and disposed within said container, means disposed outside of said container for driving said shaft, including a handle, and means cooperating with said handle whereby the milk is adapted to be discharged from the said container only after a predetermined period of agitation thereof.

7. A device of the character described for dispensing milk and the like, comprising a closed container having bottom, top and side walls, one wall of said container being provided with means for dispensing milk from said container, said means comprising a detachable nozzle provided with a valve seat and a ball valve, a spring pressing said ball valve against said seat for normally rendering said dispensing means ineffective, a rotatably mounted agitator journalled in one wall of said container and having a paddle disposed within said container, means for operating said agitator, said last named means being disposed outside of said container and including means whereby the milk dispensing means is rendered effective against the action of said spring.

8. A beverage dispensing device comprising a beverage chamber having bottom and side walls, an agitator disposed in said chamber, a removable closure serving as a top wall of said chamber, means for driving said agitator including a shaft journalled in said closure, said operating means and said agitator being mounted on said closure, said closure including a wall separating said chamber from said driving means, normally ineffective beverage discharge means mounted on said closure, said discharge means communicating with said chamber, means for causing said operating means to render said beverage discharge means effective only after a predetermined period of operation, and means for enclosing said operating means and said discharge means in said closure whereby tampering therewith is prevented.

MORRIS KESSLER.
JULIUS HADER.